Figure 2:
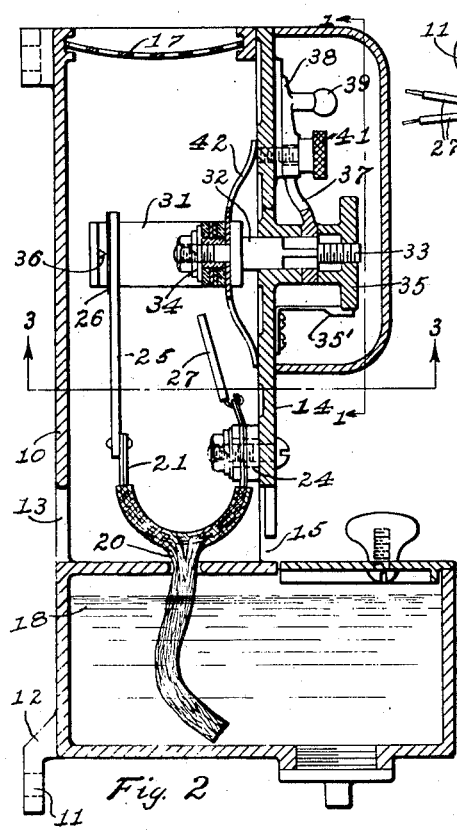

July 13, 1926.

A. J. LOEPSINGER 1,592,776

HUMIDITY REGULATOR

Filed July 13, 1922

INVENTOR
Albert J. Loepsinger
BY
Mitchell, Chadwick Kent
ATTORNEYS

Patented July 13, 1926.

1,592,776

UNITED STATES PATENT OFFICE.

ALBERT J. LOEPSINGER, OF PROVIDENCE, RHODE ISLAND, ASSIGNOR, BY MESNE ASSIGNMENTS, TO GENERAL FIRE EXTINGUISHER COMPANY, OF PROVIDENCE, RHODE ISLAND, A CORPORATION OF DELAWARE.

HUMIDITY REGULATOR.

Application filed July 13, 1922. Serial No. 574,734.

This invention relates to improvements in humidity regulators. More particularly it relates to apparatus for starting, stopping or varying the action of devices that are arranged to affect the humidity of air, in order to maintain the humidity at a predetermined value. It is a further object to provide for maintaining a desired relative humidity notwithstanding variations of local temperature. Inasmuch as the capacity of air for holding moisture changes with the temperature, and as the wet bulb depression corresponding to a desired relative humidity differs at different temperatures, rather delicate distinctions have to be taken into account, in order that the apparatus may respond only to those changes of either temperature or moisture content, or both, which require an opening or closing of valves, dampers or switches, etc., for the purpose of correcting any departure from the predetermined conditions which it is the object of the regulator to maintain constant. Apparatus for this purpose as heretofore constructed has involved more or less complicated mechanisms, acting indirectly, and producing forces which have to be combined mechanically into a resultant force and movement in order to set in operation the forces for opening or closing the desired valves, dampers, switches, etc.

It is a purpose of the present invention to provide an extremely simple, rugged and reliable regulating mechanism; and by simple means to provide so that it can either maintain in the air a fixed humidity or a humidity varying according to a predetermined law with changes of temperature; and to have the motors, connections and adjustments of the utmost simplicity, so that the apparatus is both inexpensive to manufacture, not likely to get out of order, and workable without special skill.

These objects of the invention are attained by providing two thermostatic elements, one experiencing and reacting to dry bulb temperature, and the other experiencing and reacting to wet bulb temperature, and each of them constituting a motor for moving an electrical contact point according to the changes of temperature which it detects. These electrical points are set in space adjacent to each other, and are arranged to control the desired action of valves, dampers, etc., by making or breaking contact. The wet bulb contact point may be set at a predetermined distance from the dry bulb contact point, corresponding to the wet bulb depression which it is desired to maintain. When the points get nearer together, as by increase of temperature causing the dry bulb contact to move, while the corresponding increase of capacity of the air to hold moisture is not met by the supply of incoming moisture so as to move the wet bulb contact point a corresponding distance, a contact becomes established between the two points permitting a current to flow and the proper change of valve or damper setting to be made. When the increase of humidity in the air reduces the evaporation at the wet bulb thermostat and thus diminishes the cooling effect thereof, and thus causes that thermostat to register a temperature nearer to that registered by the dry bulb thermostat the wet bulb point moves away from the dry bulb point, breaking the circuit and thereby establishing that different arrangement of valve or damper which is suited to the change of conditions in the air. This arrangement may be embodied in two U-shaped thermostatic members, one mounted in normal atmosphere and the other encased in a wick so that, on the principle of a wet bulb thermometer, it is subject to a reduced temperature, resulting from the evaporation and consequent extraction of heat from it. These two U's being set opening toward each other, with one end of each fixed; with the other end of each free, and preferably provided with a stiff extension so as to magnify its movement; and with these free ends over-lapping each other with contact points so as to form a make and break contact, all necessary elements are present. The distance between these points represents the desired wet bulb depression which the instrument is to maintain. This may be made adjustable by making one of the points adjustable in position. The distance of each point from the curve of the thermostatic U which swings it determines the distance which it will move for a unit difference of temperature. Therefore, by lengthening said distance for one of the points relative to the corresponding distance of the other a greater throw per unit difference of temperature is attained for the thermostat carrying that point. To this end the fixed mounting of one of the thermostats is preferably adjustable toward and from the fixed mounting of the other. A scale may be inscribed on the instrument. One mark of this scale may show the position occupied when the throw of the two points is equal, in which case there will be a uniform wet bulb depression for all temperatures. Another may show where it is positioned when its throw due to a unit change of temperature bears any certain ratio to the throw of the other for the same unit change of temperature. This is useful where it is desired to maintain a relative humidity of predetermined value regardless of changes of surrounding temperature. Where it is desired to maintain the relative humidity at a fixed value, say 80 per cent, that percentage corresponds to a greater wet bulb depression at 80 degrees of room temperature than it would correspond to at a room temperature of 70 degrees. The two thermostats may be set, by moving one of them to the proper place, which may be determined by experiment and indicated on a scale marked on the instrument, so that when the room temperature moves from 70 degrees to 80 degrees the swing of the contact point on the dry bulb temperature arm shall be less than that of the wet bulb contact point, for a similar change of temperature, thereby tending to increase the gap between them, and so requiring a greater depression of the wet bulb point to exist in order to make the contact and thus to set the humidifying apparatus into action.

Other methods of providing for this adjustment may be used with the apparatus which is herein described, including, for example, the selection of metals for the thermostatic elements whose differential of expansion is different in one thermostat from the other. It is intended that the patent shall cover, by suitable expression in the appended claims, whatever features of patentable novelty exist in the invention disclosed.

One embodiment of the invention is illustrated in the accompanying drawings, in which—

Figure 1:
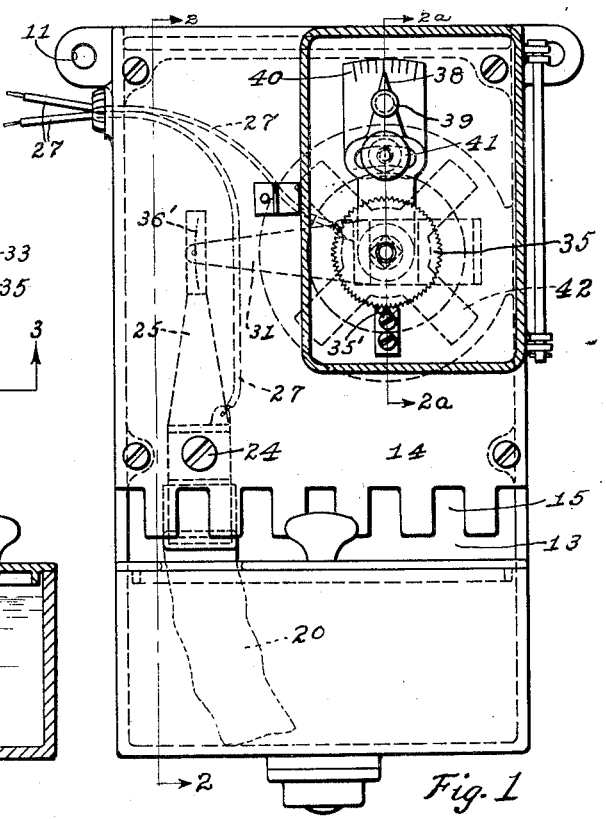
Figure 3:
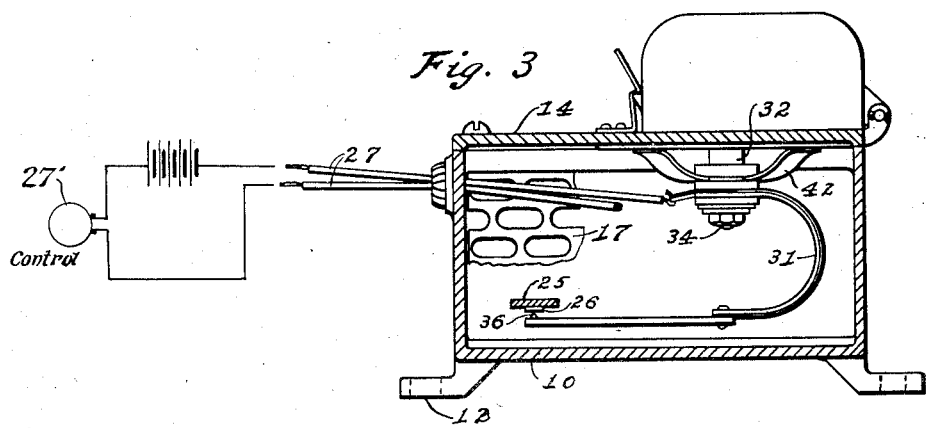

Figure 1 is a front elevation, with cover removed on the section line 1—1 of Figure 2;

Figure 2 is a side elevation with the body in section on the line 2—2 of Figure 1, but with that part constituting its cover and its contents broken away to the line 2ª—2ª; and Figure 3 is a bottom view in section, looking upward on the section line 3—3 of Figure 2, rotated 90 degrees into the plane of Figure 1.

In the drawings there is represented a frame or casing 10 adapted to be mounted against a wall as indicated, where it may be secured by screws at 11. These screw holes are in legs 12 which set it out at a little distance from the wall so as to permit free circulation of the air to reach the opening 13 through the back wall of the casing. The front plate of the casing marked 14 provides an opening 15 with serrated edge, and the top has a coarse screen 17, so that the enclosed space has abundant circulation of air and yet its contents are protected. In this space are the two thermostats 21 and 31; and forward of them are the adjusting knobs 35 and 39 on the face of the front plate; and under them a well 18 with water whence rises a wick 20 whose upper portion is fitted around the U of the thermostat 21. These simple arrangements, with wires 27 of an electric circuit passing through the thermostats in series and having connection with suitable control mechanism 27' for controlling humidifying apparatus, comprise the apparatus.

The thermostats are similar, each being of any ordinary or suitable type, as illustrated, and as preferred, each consists of two metal strips with diverse coefficients of expansion, secured together. The metal having the greater coefficient of expansion being on the inside of the curve, any rise of temperature causes a tendency of the metal to open the U more widely. One leg of each U is rigidly secured; the other end is free and carries an extension in the form of a rod whose face, near its tip, has a bit of platinum or other spark resistant metal suitable for making electrical contacts; and the two are arranged so that they move along substantially parallel paths, with rise and fall of temperature, making or breaking contact according as one moves relatively more or relatively less than the other. The elements described may be variously arranged, but in the convenient form illustrated the wet thermostat is an erect U, with one end clamped rigidly on the front wall at 24 and with the bend of the U set just above the well where the wick 20 easily reaches it and where air circulates through the casing surrounding it. The throw of its free end is toward and from the wall; and the extension rod 25 at this free end carries a contact bar 26, any point along which may be the actual point with which the contact point 36 on the other thermostat engages. Said other thermostat, 31, has one leg rigidly mounted in a clamp 34 which in turn is mounted on the front wall 14 and is adjustable in two directions: first, toward and from the wall; and second, rotatably to move its contact point up and down along the said contact bar 26 of the wet thermostat. For convenience of reference the throw of the free end 21 and extension 25 of the thermostat is herein spoken of as an angular motion, and the bar 26 along which the contact point of the other thermostat may be set is spoken of as being radial.

These terms are suggested by the fact that if the relatively minute movement referred to were continued far enough the bar 26 and its support 25 would swing through a quadrant from the U-form and vertical position in which they are illustrated, to a position of horizontality toward the left and on to a reversed curvature below the horizontal, due to the assumed continued expansion of the upper member of the bi-metallic thermostat relative to the lower member thereof, much like the swing of a radial element having angular motion. In this sense the left leg 21 and bars 25, 26 of the wet bulb thermostat constitute a bar extending in a radial manner from the region of the bend of the U.

The clamp 34 of the thermostat 31 is carried on a stem 32 which passes through the front wall 14 and is journaled therein and has a screw 33 whereon is a nut 35 arranged with serrated edge to be locked in any position by a spring latch 35'. Said stem has a squared portion on which fits an arm 37 with knob 39 by which the stem can be turned. The extent of turning can be noted, and positions predetermined for future setting, by a pointer 38 and scale 40. Such turning sets the contact point 36 at greater or less distance along the leg 25 of the wet thermostat 21; where it can be made fast by the pointer-clamping screw 41.

By turning the nut 35 the base of the thermostat 31 is drawn toward the front wall until an intervening four-legged bowed stiff spacing spring 42 is compressed against the back side of that wall to a suitable degree. Thereafter a turning of the nut 35 in either direction will move this thermostat 31 toward or from the front wall, thereby setting its contact point 36 correspondingly toward or from the front wall. Rotation of the thermostat about stem 32 on such occasion is prevented by the arm 37 and clamping screw 41, the squared stem slipping through the arm.

The temperature of the wet thermostat depends upon the temperature of the air which circulates through the instrument and upon the humidity of that air. It ordinarily is less than the temperature of this air because the evaporation from the wick 20 takes heat from the metal of the thermostat which it surrounds. When the air contains less moisture ("lower humidity") the evaporation proceeds more rapidly and the more rapid draft of heat from the wet thermostat causes its contact bar 26 to occupy a position corresponding to lower temperature. The extent to which it thus departs from the position it would occupy if dry corresponds to the so called "wet bulb depression".

The wet bulb depression which the apparatus is to maintain is set by turning the nut 35, thus shifting the contact point 36 on the dry bulb thermostat toward or from the wet bulb thermostat. The apparatus can be set so that the wet bulb depression will be equal or will vary for different temperatures by turning the arm 37, thus swinging the contact point 36 about stem 32 as indicated by the dot and dash line path 36' in Figure 1. This sets it at varying distances from the point about which the leg of the wet thermostat swings, so that a given change of temperature, applied to both thermostats, produces the desired ratio of distance moved by the contact point 36 as compared with the simultaneous movement of the contact bar 26.

When the arm 37 is turned the latch 35' is first to be released, in which case the nut 35 turns with the arm 37 and there is no axial movement of the stem 32 and thermostat 31, and no slip from the existing adjustment for wet bulb depression, because if the friction between the nut 35 and arm 37 continues tight, the slip only occurs between the arm 37 and the front wall 14. If the latch 35' be weak enough so that it permits the nut 35 to turn when the arm 37 is moved, the precaution of releasing the latch before turning the arm need not be observed; and such a construction as this is preferred, the tension on spring 42 being made great enough so that the nut 35 is turned by friction of the hub of arm 37 when the arm 37 is moved. On the other hand, the clamp 41 is strong enough to hold the arm 37 from turning when one, wishing to change the setting for wet bulb depression, turns the nut 35 with his fingers.

The electrical wire connection 27 leads to such distant apparatus as may be provided to effect the change in valves, dampers, or other apparatus which is to be moved by the apparatus of the invention.

In operation the apparatus is very simple. One sets the nut 35 according to the desired wet bulb depression. If this is to be maintained at all temperatures, the arm 37 is then set so that the radius with which the point of contact 36 moves, to right and to left in Figure 2, is the same as the radius with which that part of the contact bar 26 with which it has contact moves, to right and left in Figure 2. But if it be desired to have the apparatus provide humidity corresponding to a greater wet bulb depression with rise of temperature, the arm 37 may be turned to the right, Figure 1, in which case the point on contact bar 26 with which 36 makes contact will be one having a longer swing than does the dry thermostatic contact point 36 for a given angular movement of the thermostatic leg. It follows that for a given number of degrees rise of room temperature the contact point 36 does not tend to move so far as does the corresponding part of bar 26 with which it makes contact; and an electrical contact between them will not be broken until the thermostat 21 experiences greater depression due to evaporation than it was experiencing before the change of room temperature. That will occur only when the relative humidity has become lower than it was, thus producing more evaporation and greater wet bulb depression. The particular point at which the apparatus should be set for certain desired results can be predetermined and marked on the apparatus, or noted on scale 40 of the arm for the ratio, and a scale (not shown) on the nut 35 for wet bulb depression.

Taken as a whole the invention reduces the active elements for humidity regulation to very simple terms by the use of simple thermostatic strips one of which registers temperature only and the other of which while responding to temperature is affected by the degree of humidity in the air. Without any intervening levers, linkage, etc., these two moving parts automatically indicate the humidity value for all temperatures and have sufficient power, by making or breaking contact, to set into operation devices for changing the humidity or the temperature, or for giving signals, or doing such other work as may be desired. And by the simple device of changing their relative radius of throw they can make this indication at a ratio which provides increase of humidity at a rate faster or slower than the increase of temperature as may be desired.

I claim as my invention:—

1. A controller comprising two thermostats, one of which is exposed to a cooling influence resulting from evaporation; the said thermostats being connected in series in an electric circuit, adapted for mutual contact and arranged for their contact points to move along substantially parallel paths with rise and fall of temperature, operating as a controller according to the mutual relations of these two contact points as one moves relatively more or less than the other.

2. A humidity regulator comprising two thermostats, one of which is exposed to the cooling influence of evaporation, each having a part fixed and a part freely moved by temperature changes, said freely moved parts being adapted to make and break contact with each other in an electric humidity-controlling circuit, operating as a regulator according to the made or broken character of the circuit at the time being.

3. A humidity regulator comprising two metallic thermostatic bars and an electric circuit arranged to pass through them in series and to control humidity; said bars having freely movable portions, moving similarly with change of temperature, and one of them being subject to cooling influences of evaporation, whereby they make and break contact according to changes of humidity.

4. A humidity regulator comprising two metallic thermostatic bars, each in U shape with one end fixed and with a make and break contact with the other at its free end; and an electric circuit arranged to pass through them in series and to control humidity; and one of them being subject to cooling influences of evaporation, whereby they make and break contact according to changes of humidity.

5. A humidity regulator comprising two metallic thermostatic bars, each in U shape with one end fixed and with its free end extended, whereby the movement resulting from change of curvature of the U is magnified, and arranged for a make and break contact with the other at its free end; and an electric circuit arranged to pass through them in series and to control humidity; one of the thermostats being subject to evaporation cooling, whereby they make and break contact according to changes of humidity.

6. A controller comprising the combination, with a single electric circuit adapted by variation of current therein to control humidity, of two thermostats having free parts traveling approximately in the same path in close proximity to each other and adapted by the relative proximity of the moving part of one to the cooperating moving part of the other to vary the current in said circuit; one of the said thermostats being exposed to evaporation cooling whereby in responding to atmospheric temperature it has varying lag behind the other, depending upon humidity.

7. A controller comprising the combination of two thermostats arranged for single mutual contact and adapted thereby to coact to make and break a single humidity-controlling circuit, one of the thermostats being exposed to evaporation cooling.

8. A controller having a motor comprising the combination of two thermostats whose operative ends tend to move in approximately the same path, one of them being exposed to evaporation cooling whereby in the two thermostats differential tendencies to motion result from change of atmospheric humidity, and means, responsive to both contact and separation of said thermostats resulting from their said differential tendencies, adapted to control humidity.

9. A humidity controller comprising, in combination, two thermostats adapted to react directly upon each other at a single point of contact between them, one of them being exposed to evaporation cooling; the elements at said point of contact being adapted by their relative positions to affect the action of a control system for humidity.

10. Controlling apparatus comprising two thermostats, one of which is exposed to evaporation cooling, combined with control means operated by relative motion of said thermostats under change of temperature; there being means whereby the establishing or the dis-establishing of contact between the two thermostats operates the said control.

11. A controller comprising in combination a thermostat subject to evaporation cooling, a thermostat registering atmospheric temperatures, means whereby one certain face of one of these thermostats cooperates with one certain face of the other of these thermostats, changes of humidity producing differences of reaction between these two said faces, and means whereby the reaction between said faces indicates humidity changes.

12. A controller comprising the combination of two thermostats arranged for mutual contact, each with its contact point upon one side only, said controller operating by the variations in position of said two points relative to each other, one of them being subject to evaporation cooling; and means to vary their ratio of travel responding to equal temperature change.

13. A controller comprising the combination of two thermostats having contact members arranged to operate the controller by contact between said members, one of the thermostats being subject to evaporation cooling, and means to vary their ratio of travel in responding to equal temperature change, comprising the mounting of one of them for angular motion of its contact member under temperature changes, and the mounting of the other on a rotatable stem parallel to and offset from the plane wherein the said angular motion occurs, whereby the turning of the stem may set its contact member so as to establish the contact at varying selected points along the radius of the first said contact member.

14. A controller comprising the combination of two thermostats one of which is subject to evaporation cooling, with means for mutual electrical contact; each thermostat having its free portion extending at right angles to the free portion of the other and one of these being mounted for rotation to settings where it makes contact with the other at different lengths thereon from the fixed part thereof.

15. A humidity regulator comprising two thermostats, one of which is exposed to evaporation cooling, co-operating by making or breaking contact along a common line of travel; means to hold the base of each fixed; and means comprising an opposed-spring-and-screw clamp mounting to set the base of one to and fro in the direction of said travel.

16. A humidity regulator comprising two thermostats, one of which is exposed to evaporaton cooling, co-operating by making or breaking contact along a common line of travel; means to hold the base of each fixed; means to set the base of one to and fro in the direction of said travel; and means to move the base of one without changing relations in the direction of travel, so that its free part makes contact with the other thermostat at a place where that other has a different amplitude of travel.

17. A controller comprising the combination of two thermostats having their operative ends arranged for movement toward and from each other, one of them being exposed to evaporation cooling whereby changes of humidity affect the relative movements of said ends, and means responsive to separation of said ends, for controlling humidity.

18. A humidity regulator comprising two coacting thermostats one of which is exposed to evaporation cooling and a mounting comprising means independent of temperature to set one toward or from the other in their direction of response to temperature fluctuations, comprising a spring and opposing screw clamp, and to set one for contact at different points along the other, comprising a shaft adapted to rotate on the axis of the screw clamp without disturbing the setting of the screw clamp.

19. A humidity regulator comprising two coacting thermostats one of which is exposed to evaporation cooling, and a mounting comprising means independent of temperature to set one toward or from the other in their direction of response to temperature fluctuations, and to set one for contact at different points along the other; and indicating marks, showing predetermined positions of the mounting that correspond to specific relative humidities, for setting the one thermostat so that its contact point moves at a predetermined different rate from that of the other.

Signed at Providence, Rhode Island, this sixth day of July, 1922.

ALBERT J. LOEPSINGER.